April 18, 1933. E. D. EBY 1,904,423
INDICATOR FOR RESERVOIRS FOR LIQUID FILLED CABLES
Filed Oct. 26, 1931
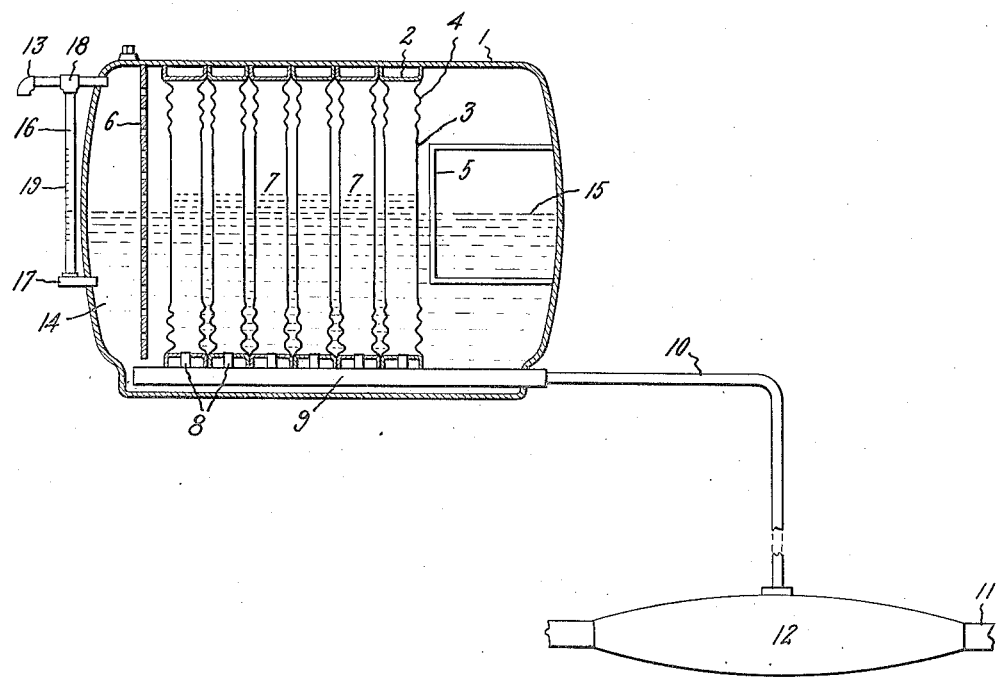
Inventor:
Eugene D. Eby,
by *Clark E. Tullar*
His Attorney Patented Apr. 18, 1933

1,904,423

UNITED STATES PATENT OFFICE

EUGENE D. EBY, OF PITTSFIELD, MASSACHUSETTS, ASSIGNOR TO GENERAL ELECTRIC COMPANY, A CORPORATION OF NEW YORK

INDICATOR FOR RESERVOIRS FOR LIQUID FILLED CABLES

Application filed October 26, 1931. Serial No. 571,155.

In the operation of electric cables which are filled with liquid insulation such as thin degasified oil, it is the practice to attach thereto so-called feeding reservoirs each comprising a tank or casing containing a plurality of sealed chambered cells or elements each having flexible side walls. The chambers of the cells are connected in parallel to the cable and as the volume of the liquid in the cable increases due to a rise of temperature of the cable, the liquid flows into the chambers and in so doing presses the walls apart to increase the cubical contents of the cells. On the other hand as the liquid contracts due to decrease of temperature of the cable, the cells return liquid to the cable. Since the cells or elements are completely enclosed, there are no means whereby their condition can be observed, whether they are full or partly so or completely collapsed. So long as the cable system is operating satisfactorily and the chambers of the cells contain the proper amount of liquid for a given temperature of the cable, it is relatively unimportant to observe their condition. On the other hand, should a leak develop anywhere along the length of cable fed by the reservoir which would deplete its supply, it is of the utmost importance to know its condition, this being practically the only way that a leak can be determined. In this connection it is to be borne in mind that the cable is located in ducts below the level of the street.

The object of my invention is the provision in a cable system of a simple means whereby the liquid contents of the cells within a closed reservoir tank can be determined by outside inspection without in any way disturbing the tank or the parts contained therein.

For a consideration of what I believe to be novel and my invention, attention is directed to the accompanying description and the claim appended thereto.

In the accompanying drawing which is illustrative of my invention is shown a feeding type reservoir connected to a length of liquid filled cable.

1 indicates a closed rigid wall metal tank or casing located at a suitable elevation to give the desired hydrostatic pressure and containing a plurality of independent cells or elements, each comprising an outer ring 2 and thin side members or walls 3 which are corrugated at 4 to increase their flexibility. The cells are placed close together so as to be mutually supporting as the walls move outwardly to accommodate an increased volume of liquid. At the right hand end is located a support 5 to protect the adjacent cell wall, and at the left hand end is located a perforated plate 6 to protect the adjacent cell wall. The specific construction of the cellular elements is immaterial to the present invention, that described being merely illustrative of one suitable for the purpose. The main thing is that the cells shall have flexible side walls which move in and out as the volume of the liquid contained in the cable changes.

The chambers 7 of the cells contain the same degasified liquid as that in the cable and are connected in parallel by short conduits 8 to a manifold 9 and the latter is connected by a conduit 10 to a suitable part of the liquid filled cable 11, as for example through one of the joint casings 12.

Because the reservoir cells are designed to operate at a pressure which is substantially atmospheric, the tank or casing 1 is provided with a breather pipe 13 having a down turned end to prevent the entrance of foreign matter. It may be connected at any suitable place.

In order that the contents of the cells may be determined, in other words whether they are fully expanded or otherwise, from the outside of the tank, the tank is partly filled with what may be termed immersion oil, indicated by the reference numeral 14 and in which the cells are partly submerged. Because the movements of the walls of the cells should not be restrained by the immersion oil, the tank is only partially filled which permits complete freedom of action. The level of this oil is indicated by the horizontal line 15. The oil is entirely separated from that contained in the chambers 7 of the cells and must be so maintained because it contains air, gases, or other impurities which must not be permitted to enter the cable 11 under any conditions. Since the walls of the cells move toward and away from each other as the liquid within the cable and chambers of the cells expands and contracts, such movements will exert a direct effect on the oil 14, raising or lowering its level as the case may be. In order that this change of level may be observed from the outside of the tank an indicating means such as a gauge glass 16 is provided and supported by two hollow fittings 17 and 18. As the oil level within the tank changes, the column of oil in the gauge glass will likewise change. The gauge has suitable markings 19 thereon calibrated in terms of deflection of the walls of the cells. Knowing the normal level of the oil for given working conditions, comparison between the oil level in the gauge glass and the scale marking will indicate at once any abnormal condition of the oil supply within the reservoir and cable 11. If the oil level is lowered to an abnormal degree, it indicates that liquid is leaking from the cable and that steps must be taken according to established practice to locate the place of the leak and make the necessary repairs.

The immersion oil 14 in addition to indicating movements of the cell walls also serves the important function of protecting said wall and the interior parts of the tank from erosion due to the damp atmosphere in which the reservoir is located. In some cases these reservoirs are mounted on towers and in other cases in manholes below the level of the street.

What I claim as new and desire to secure by Letters Patent of the United States is:

A reservoir comprising a rigid walled tank the interior of which is exposed to atmospheric pressure and is closed against internal inspection, individual cellular elements sealed against the admission of air located in the tank and arranged side by side, each of said elements having flexible side walls and a chamber, a manifold located within the tank and connected to the chambers in parallel to deliver liquid thereto and receive it therefrom, a body of liquid in the tank in which the elements are partly submerged, the liquid in the chambers of the elements and the submerging liquid being separately maintained, and a sight indicator external to the tank and connected thereto and from which the submerging liquid is free to flow, said indicator being calibrated in terms of movements of the walls of the elements.

In witness whereof, I have hereunto set my hand.

EUGENE D. EBY.